US006876866B1

(12) United States Patent
Ulupinar et al.

(10) Patent No.: US 6,876,866 B1
(45) Date of Patent: Apr. 5, 2005

(54) MULTI-STATE POWER CONTROL MECHANISM FOR A WIRELESS COMMUNICATION SYSTEM

(75) Inventors: Fatih Ulupinar, San Diego, CA (US); Rashid Attar, San Diego, CA (US); Eduardo Esteves, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 374 days.

(21) Appl. No.: 09/615,355

(22) Filed: Jul. 13, 2000

(51) Int. Cl.[7] ............................................... H04B 7/00
(52) U.S. Cl. ..................... 455/522; 455/127.1; 370/335
(58) Field of Search ............................. 455/522, 67.1, 455/69, 115; 370/318, 335, 342, 441, 127.1, 127.2

(56) References Cited

U.S. PATENT DOCUMENTS

| | | | |
|---|---|---|---|
| 4,901,307 A | | 2/1990 | Gilhousen et al. |
| 5,056,109 A | | 10/1991 | Gilhousen et al. |
| 5,103,459 A | | 4/1992 | Gilhousen et al. |
| 5,265,119 A | | 11/1993 | Gilhousen et al. |
| 5,745,520 A | * | 4/1998 | Love et al. .................. 375/130 |
| 5,751,763 A | | 5/1998 | Bruckert |
| 5,946,346 A | * | 8/1999 | Ahmed et al. ............... 375/219 |
| 5,982,760 A | * | 11/1999 | Chen ........................... 370/335 |
| 6,084,904 A | * | 7/2000 | Wang et al. .................. 375/130 |
| 6,151,508 A | * | 11/2000 | Kim et al. .................... 455/522 |
| 6,185,431 B1 | * | 2/2001 | Li et al. ....................... 455/522 |
| 6,185,432 B1 | * | 2/2001 | Vembu ......................... 455/522 |
| 6,252,865 B1 | * | 6/2001 | Walton et al. ............... 370/335 |
| 6,275,712 B1 | * | 8/2001 | Gray et al. ................... 455/522 |
| 6,337,987 B1 | * | 1/2002 | Agin et al. ................... 455/522 |
| 6,411,799 B1 | * | 6/2002 | Padovani ....................... 455/69 |
| 6,449,463 B1 | * | 9/2002 | Schiff ........................... 455/69 |
| 6,480,481 B1 | * | 11/2002 | Park et al. .................... 370/342 |
| 6,643,272 B1 | * | 11/2003 | Moon et al. ................. 370/311 |
| 6,763,244 B2 | * | 7/2004 | Chen et al. .................. 455/522 |

FOREIGN PATENT DOCUMENTS

| | | |
|---|---|---|
| EP | 0825728 A2 | 2/1998 |
| WO | 99/56405 | 11/1999 |

* cited by examiner

*Primary Examiner*—Charles Appiah
(74) *Attorney, Agent, or Firm*—Philip Wadsworth; Sandra L. Godsey; Thomas Rouse

(57) ABSTRACT

A power control mechanism having a number of states and suitable for used in a communication system in which data transmissions are not continuous (i.e., bursty in nature). In one embodiment, a power control unit includes a data processor, a state machine, and a threshold adjustment element. The data processor receives and processes an input signal to provide status of data frames received from the input signal for a particular data transmission. The state machine receives the frame status and provides a current state for the power control unit. The current state is indicative of a status of a particular communication session that includes the data transmission, and is one of a number of possible states. The threshold adjustment element receives the frame status and the current state and adjusts a power control setpoint in response thereto. The setpoint is used to control the signal quality of the input signal and is adjusted in accordance with a particular adjustment scheme (i.e., a particular set of "rules") selected from a number of possible adjustment schemes. Each possible adjustment scheme is associated with a respective possible state and defines a particular set of rules for adjusting the setpoint.

30 Claims, 13 Drawing Sheets

MULTI-STATE POWER CONTROL MECHANISM FOR A WIRELESS COMMUNICATION SYSTEM

BACKGROUND OF THE INVENTION

I. Field of the Invention

The present invention relates to data communication. More particularly, the present invention relates to a novel and improved multi-state power control mechanism for use in a wireless communication system.

II. Description of the Related Art

A modern day communication system is required to support a variety of applications. One such communication system is a code division multiple access (CDMA) system that supports voice and data communication between users over a terrestrial link. The use of CDMA techniques in a multiple access communication system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS," and U.S. Pat. No. 5,103,459, entitled "SYSTEM AND METHOD FOR GENERATING WAVEFORMS IN A CDMA CELLULAR TELEPHONE SYSTEM." Another CDMA system is disclosed in U.S. patent application Ser. No. 08/963,386, entitled "METHOD AND APPARATUS FOR HIGH RATE PACKET DATA TRANSMISSION," filed Nov. 3, 1997, now U.S. Pat. No. 6,574,211, issued Jun 3, 2003 to Padovani et al., (hereinafter referred to as the HDR system). These patents and patent application are assigned to the assignee of the present invention and incorporated herein by reference.

CDMA systems are typically designed to conform to one or more standards. Such standards include the "TIA/EIA/IS-95-B Mobile Station-Base Station Compatibility Standard for Dual-Mode Wideband Spread Spectrum Cellular System" (the IS-95 standard), the "TIA/EIA/IS-98 Recommended Minimum Standard for Dual-Mode Wideband Spread Spectrum Cellular Mobile Station" (the IS-98 standard), the standard offered by a consortium named "3rd Generation Partnership Project" (3GPP) and embodied in a set of documents including Document Nos. 3G TS 25.211, 3G TS 25.212, 3G TS 25.213, and 3G TS 25.214 (the W-CDMA standard), and the "TR-45.5 Physical Layer Standard for cdma2000 Spread Spectrum Systems" (the cdma2000 standard). New CDMA standards are continually proposed and adopted for use. These CDMA standards are incorporated herein by reference.

In a CDMA system, communication between users is conducted via one or more base stations. A first user on one remote terminal (e.g., a cellular phone) communicates with a second user on a second remote terminal by transmitting data on the reverse link to a base station. The base station receives the data and may route the data to another base station. The data is transmitted on the forward link of the same base station, or a second base station, to the second remote terminal. The forward link refers to transmission from the base station to a remote terminal and the reverse link refers to transmission from the remote terminal to a base station. In CDMA systems, the forward and reverse links are typically allocated different frequencies.

On the reverse link, each transmitting remote terminal acts as interference to other active remote terminals in the network. The reverse link capacity is thus limited by the total interference that each remote terminal experiences from other transmitting remote terminals.

To reduce interference and increase the reverse link capacity, the transmit power of each remote terminal in the IS-95 system is controlled by two power control loops. The first power control loop adjusts the transmit power of the remote terminal such that the signal quality, as measured by the energy-per-bit-to-noise-plus-interference ratio, $E_b/(N_o + I_o)$, of the signal received at the base station is maintained at a particular threshold or level. This level is referred to as the power control setpoint (or simply, the setpoint). The second power control loop adjusts the setpoint such that a desired level of performance, as measured by the frame-error-rate (FER), is maintained.

A power control mechanism for the reverse link is disclosed in detail in U.S. Pat. Nos. 5,056,109 and 5,265,119, both entitled "METHOD AND APPARATUS FOR CONTROLLING TRANSMISSION POWER IN A CDMA CELLULAR MOBILE TELEPHONE SYSTEM," assigned to the assignee of the present invention, and incorporated by reference herein.

In some CDMA systems, such as the HDR system, data transmission from the remote terminal may not be continuous (i.e., bursty). In particular, the data transmission may be characterized by bursts of data transmission separated by periods of silence (i.e., no transmission). During the silence periods, no data transmission is available to adjust the setpoint. However, the operating conditions of the remote terminal may have changed (e.g., due to movement of the remote terminal). Thus, the transmit power level last used by the remote terminal may not be sufficient to achieve an error-free transmission when data transmission restarts.

As can be seen, techniques that can be used to adjust the transmit power level of a remote terminal in a communication session characterized by non-continuous data transmission are highly desirable.

SUMMARY OF THE INVENTION

The present invention provides a power control mechanism having a number of states and suitable for use in a communication system in which data transmissions are not continuous (i.e., bursty in nature). Each state is indicative of the status of a particular communication session between a remote terminal and a base station. The status may indicate, for example, whether or not the remote terminal is active, whether the remote terminal has been transmitting for a while or has just started transmitting after a period of inactivity, and so on. Each state is also associated with a particular set of "rules" for adjusting the power control mechanism.

An embodiment of the invention provides a power control unit for use in a wireless communication system. The power control unit includes a data processor, a state machine, and a threshold adjustment element. The data processor receives and processes an input signal to provide status of received data frames. The state machine receives the frame status and provides a current state for the power control unit. The current state is indicative of a status of a particular communication session that includes the data transmission, and is one of a number of possible states for the power control unit. The threshold adjustment element receives the frame status and the current state and adjusts a power control setpoint (or simply, the setpoint) in response thereto. The setpoint is used to control the transmit power of a remote terminal and is adjusted in accordance with a particular adjustment scheme selected from a number of possible adjustment schemes. Each possible adjustment scheme is associated with a respective possible state and defines a particular set of rules for adjusting the setpoint.

In one specific implementation, the possible states include an inactive state, a no data state, a data start state, and a normal state. In this implementation, each frame status indicates a receipt of a good frame, a bad frame, or no received frame for the frame period. For this implementation, the power control unit can transition among the possible states as follows: (1) from the inactive state to the no data state upon receipt of an indication that at least one base station is involved in the communication session, (2) from the no data state to the data start state upon receipt of a good frame, (3) from either the no data state or the data start state to the normal state upon receipt of a bad frame, (4) from the normal state back to the no data state if no data frames are received for a particular time period, and (5) from any state to the inactive state upon receipt of an indication that no base stations are currently active. The next state can thus be defined based, in part, on the received frame status and the current state.

In the normal state, the setpoint can be decreased by a first delta value ($\Delta D_1$) upon receipt of a good frame and increased by a second delta value ($\Delta U_1$) upon receipt of a bad frame, with the magnitude of $\Delta U_1$ being greater than that of $\Delta D_1$. Successive increases in the setpoint can be performed if a particular time period has elapsed. In the no data state, the setpoint can be increased by a third delta value ($\Delta U_2$) upon receipt of a frame status indicating no received frame, with the total adjustment in the setpoint being limited to a particular maximum delta value ($\Delta U_{MAX}$). In the data start state, the setpoint can be decreased by a fourth delta value ($\Delta D_3$) upon receipt of a good frame, with the magnitude of $\Delta D_3$ being greater than that of $\Delta D_1$.

If a number of frames are received for a particular transmitted frame (e.g., for soft-handoff), the frame status for this transmitted frame can be declared as bad if all received frames are determined to be bad, and can be declared as good if at least one received frame is determined to be good.

The power control unit can be operated to adjust the transmit power level of a reverse link data transmission from a remote terminal to a base station in a CDMA system (e.g., the HDR system). For some CDMA systems, the communication session may be characterized by bursts of data transmission separated by periods of no transmission (i.e., a non-continuous data transmission). The setpoint can be adjusted in a manner to achieve a particular target frame error rate (FER) for the received frames.

The invention further provides methods, base station modules, and other elements that implement various aspects and features of the invention, as described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION OF THE SPECIFIC EMBODIMENTS

Figure 1:
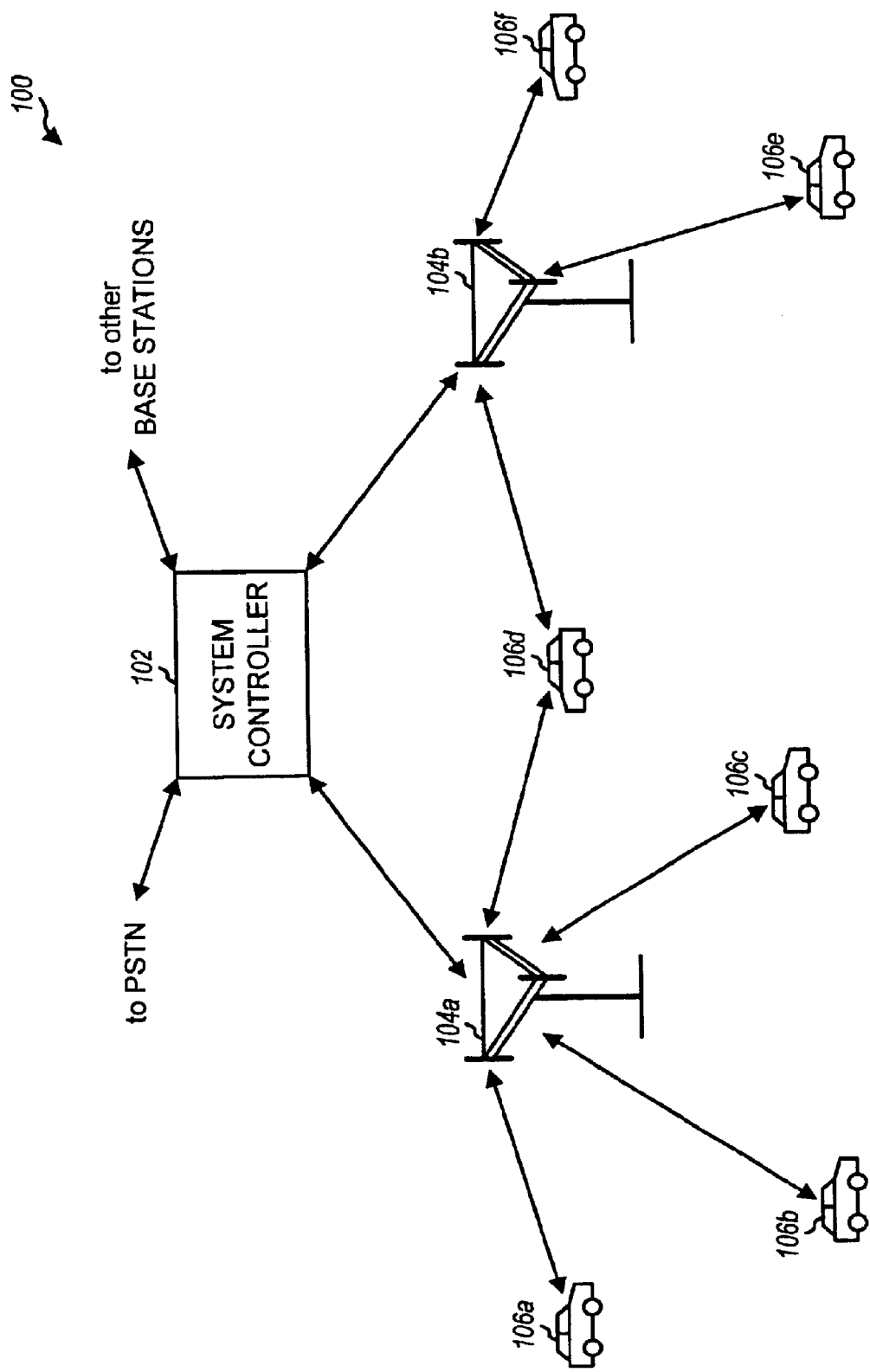
FIG. 1 is a diagram of a spread spectrum communication system that supports a number of users communicating via remote terminals that interact with a set of base stations.

FIG. 1 is a diagram of a spread spectrum communication system 100 that supports a number of users. System 100 provides communication for a number of cells, with each cell being serviced by a corresponding base station 104. Various remote terminals 106 are dispersed throughout the system. Each remote terminal 106 can communicate with one or more base stations 104 on the forward and reverse links at any particular moment, depending on whether the remote terminal is transmitting and/or receiving data and whether it is in soft handoff. As shown in FIG. 1, base station 104a communicates with remote terminals 106a, 106b, 106c, and 106d, and base station 104b communicates with remote terminals 106d, 106e, and 106f.

In system 100, a system controller 102 couples to base stations 104 and may further couple to a public switched telephone network (PSTN). System controller 102 provides coordination and control for the various base stations coupled to it. System controller 102 further controls the routing of telephone calls among remote terminals 106, and between remote terminals 106 and the PSTN (e.g., conventional telephones), via base stations 104. For a CDMA system, system controller 102 is also referred to as a base station controller (BSC).

System 100 may be designed to support one or more CDMA standards such as the IS-95 standard, the W-CDMA standard, the cdma2000 standard, or some other standard. Alternatively or additionally, system 100 may be designed to conform to a particular CDMA implementation such as the HDR design described in the aforementioned U.S. patent application Ser. No. 08/963,386, now U.S. Pat. No. 6,574,211.

For the HDR system, the communication between a particular remote terminal and one or more base stations is typically non-continuous. The remote terminal typically only transmits data to and/or receives data from the base station(s) for certain particular time periods. At remaining time periods, the remote terminal is "inactive" and may only be receiving the pilot signal(s) from the base station(s).

As noted above, on the reverse link, the transmission from each remote terminal acts as interference to other active remote terminals and thus affects the performance of these remote terminals. To improve the performance of the remote terminals and to increase system capacity, the transmit power of each remote terminal is controlled to be as low as possible to reduce the amount of interference while still maintaining a particular level of performance for the transmitting remote terminal. If the received signal quality at the base station is too poor, the likelihood of decoding the received frame correctly decreases and performance may be compromised (e.g., higher FER). On the other hand, if the received signal quality is too high, the transmit power level is also likely to too high and the amount of interference to other remote terminals increases, which can degrade the performance of the other remote terminals.

Figure 2:
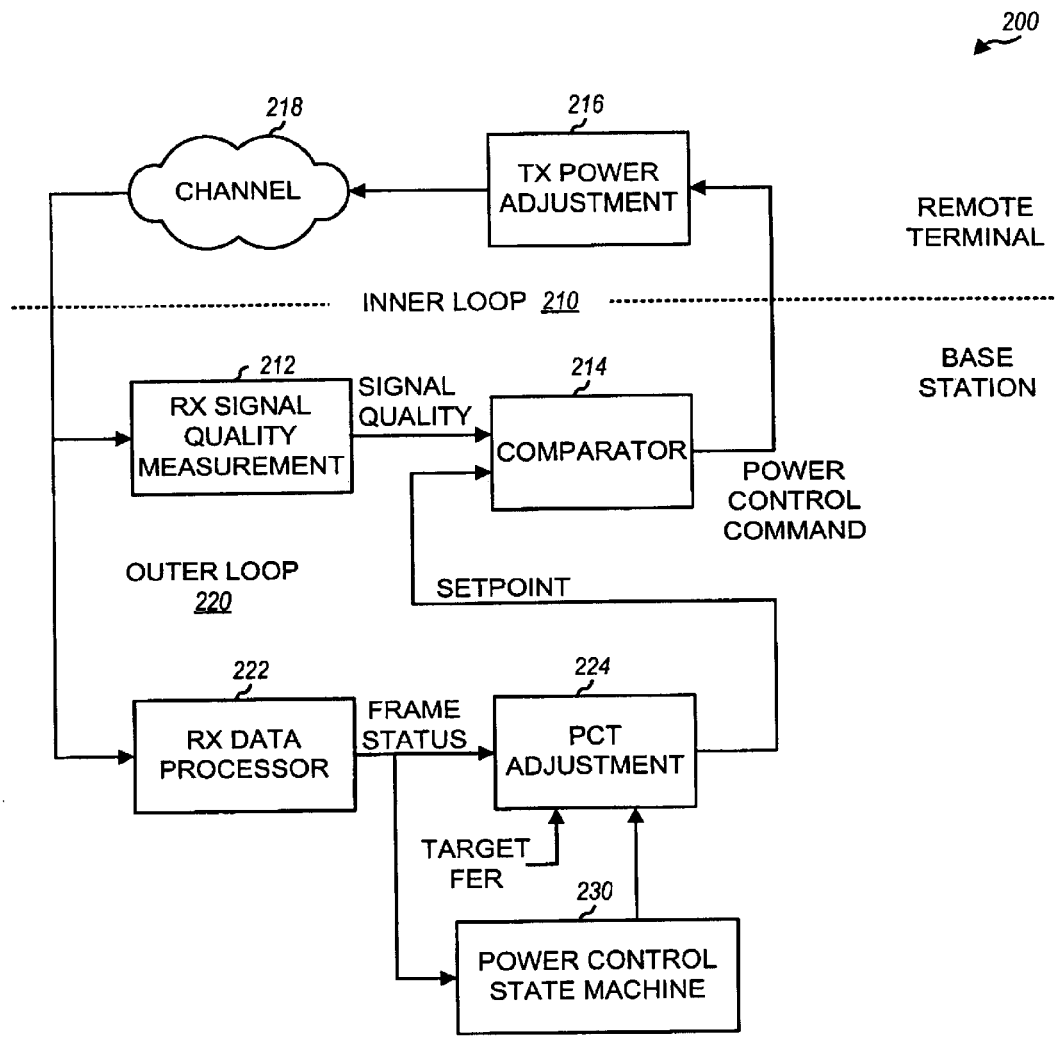
FIG. 2 is a diagram of a reverse link power control mechanism that implements some embodiments of the invention.

FIG. 2 is a diagram of a reverse link power control mechanism 200 that implements some embodiments of the invention. Power control mechanism 200 includes an inner loop power control 210 that operates in conjunction with an outer loop power control 220.

Inner loop 210 is a (relatively) fast loop that attempts to maintain the signal quality received at the base station for the remote terminal as close as possible to a particular power control setpoint. As shown in FIG. 2, inner loop 210 operates between the remote terminal and base station. The power adjustment for inner loop 210 is typically achieved by measuring the quality of the received signal at the base station (block 212), comparing the measured signal quality against the setpoint (block 214), and sending a power control command to the remote terminal. The power control command directs the remote terminal to adjust its transmit power and may be implemented, for example, as either an "UP" command to direct an increase in the transmit power at the remote terminal or a "DOWN" command to direct a decrease in the transmit power. The remote terminal then adjusts its transmit power level accordingly (block 216) each time it receives the power control command. For the HDR system, the power control command may be sent as often as 600 times per second for some CDMA systems, thus providing a relatively fast response time for inner loop 210.

Due to path loss in the communication channel (block 218) that typically varies over time, especially for a mobile remote terminal, the received signal quality at the base station continually fluctuates. Inner loop 210 thus attempts to maintain the received signal quality at or near the setpoint in the presence of changes in the channel.

Outer loop 220 is a (relatively) slower loop that continually adjusts the setpoint such that a particular level of performance is achieved for the remote terminal on the reverse link. The desired level of performance is typically a particular target frame error rate (FER), which is 1% for some CDMA systems, although some other performance target can also be used.

For outer loop 220, the signal from the remote terminal is received and processed to recover the transmitted frames and the status of the received frames are then determined (block 222). For each received frame, a determination is made whether the frame is good (i.e., received correctly) or bad (i.e., received in error). Based on the status of the received frame (either good or bad), the setpoint is adjusted accordingly (block 224). Typically, if a frame is received correctly, the received signal quality from the remote terminal is likely to be higher than necessary. The setpoint is thus reduced slightly, which may cause inner loop 210 to reduce the remote terminal's transmit power level. Alternatively, if a frame is received in error, the received signal quality from the remote terminal is likely to be lower than necessary. The setpoint is thus increased, which may cause inner loop 210 to increase the remote terminal's transmit power level.

The setpoint can be adjusted for each frame period. The frame status can also be accumulated for N received frames and used to adjust the setpoint every $N^{th}$ frame period, where N can be any integer greater than one. Since inner loop 210 is typically adjusted many times each frame period, inner loop 210 has a faster response time than for outer loop 220.

By controlling the manner in which the setpoint is adjusted, different power control characteristics and system performance can be obtained. For example, the received FER can be adjusted by changing the amount of upward adjustment in the setpoint for a bad frame, the amount of downward adjustment for a good frame, the required elapsed time between successive increases in the setpoint, and so on. In an implementation, a target FER for each state can be set as ($\Delta$Down/($\Delta$Down+$\Delta$Up)).

For a system in which data transmission occurs continuously (over the time period of interest), the inner and outer loops can be continually operated in accordance with a particular design to achieve the desired results. However, when the data transmission occurs in bursts, continuous operation of the power control mechanism based on a single set of rules may not provide the desired results.

In accordance with an aspect of the invention, the power control mechanism is designed to operate with a number of states. Each state is indicative of the status of the communication session between the remote terminal and the base station (e.g., whether or not the remote terminal is active, whether the remote terminal has been transmitting for a while or has just started transmitting after a period of silence, and so on). Each state can also be associated with a particular set of "rules" for adjusting the inner and/or outer loop. In the specific embodiment shown in FIG. 2, the state of the power control mechanism is maintained by a power control state machine 230 that directs the operation of outer loop 220. The states and rules are described in further detail below.

Figure 3:
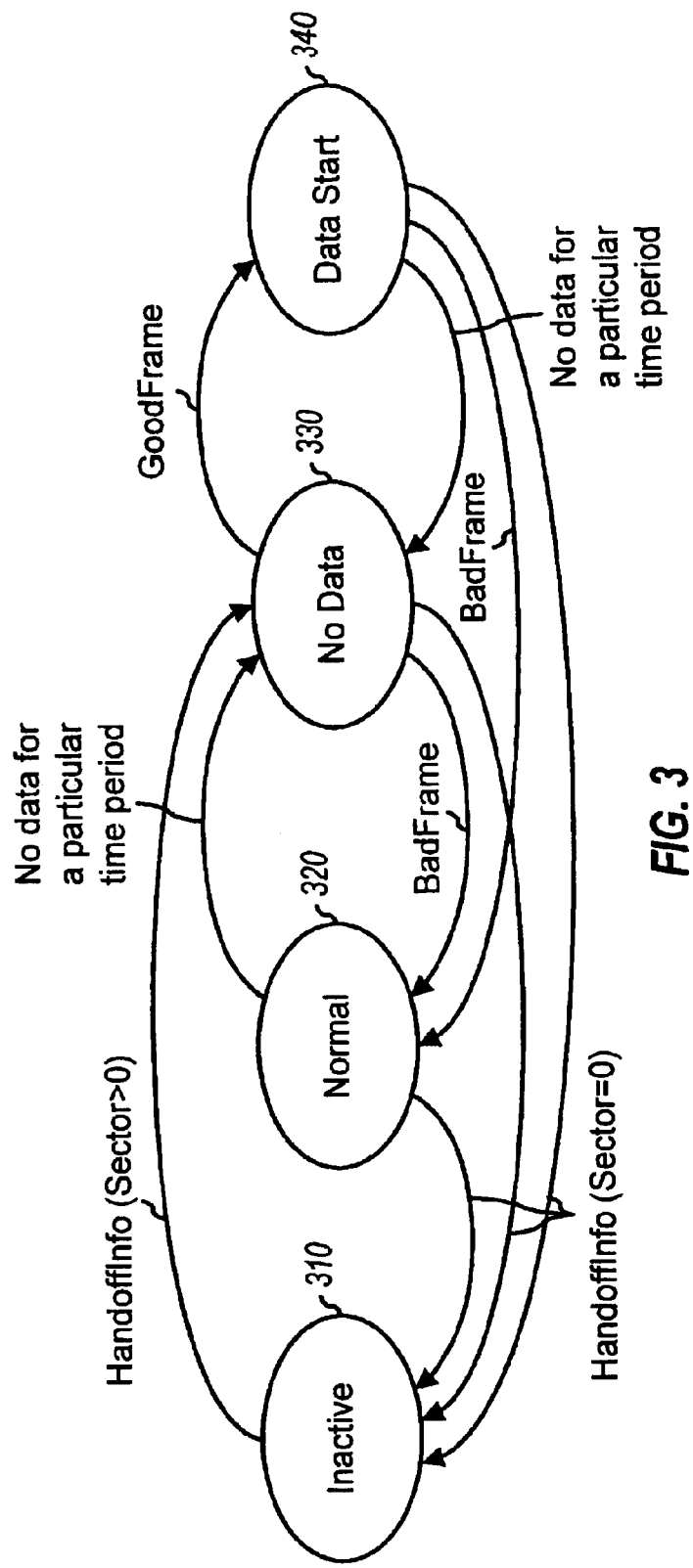
FIG. 3 is a diagram of a set of states for the power control mechanism in accordance with a specific embodiment of the invention.

FIG. 3 is a diagram of a set of states for the power control mechanism in accordance with a specific embodiment of the invention. In this embodiment, the power control mechanism includes four states designated as: Inactive state 310, Normal state 320, No Data state 330, and Data Start state 340. Greater or fewer number of states, and different states, can also be provided for the power control mechanism and this is within the scope of the invention.

Table 1 lists the four states and a brief description for the status of the communication session for each state. Generally, each state corresponds to a particular level of activity prior to or during a communication session between the remote terminal and the base station.

TABLE 1

| State | Description |
|---|---|
| Inactive | The remote terminal is in dormant mode and there is no power control activity. |
| Normal | Frames are transmitted and received on the reverse traffic channel frequently enough such that the No Data state is not entered. |
| No Data | No frames are transmitted on the reverse traffic channel and the remote terminal is not in the Dormant state. |
| Data Start | The Data Start state is entered if there is a new frame on the reverse traffic channel while in the No Data state. The power control mechanism remains in the Data Start state until a transition to the Normal state (a bad frame is received), the No Data state (no data transmission for a particular time period), or the Inactive state (no base station in the active set) occurs. |

As shown in FIG. 3, initially, the power control mechanism can start in Inactive state 310 prior to the commencement of a communication session with the remote terminal and the base station. Upon registration by the remote terminal with a particular base station, the power control mechanism can transition from Inactive state 310 to No Data state 330. The power control mechanism then remains in No Data state 330 until a frame is received from the remote terminal. If the received frame is good, the power control mechanism transitions to Data Start state 340. Otherwise, if the received frame is bad, the power control mechanism transitions to Normal state 320.

While in the No Data state, the setpoint is increased slowly (e.g., up to 0.5 dB for each frame, up to a particular total limit). The higher setpoint provides additional margin if a remote terminal is in a region of poor coverage when it starts transmitting. Thus, in the Data Start state, it is desirable to reduce the setpoint quickly, and this is achieved by using a $\Delta D_3$ in the Data Start state having a larger magnitude than that of the $\Delta D_1$ in the Normal state. If a bad packet is received, the additional margin is no longer present and the power control mechanism therefore switches to the Normal state.

The power control mechanism remains in Data Start state 340 until a bad frame is received from the remote terminal or if no data is received within a first particular period of time. Upon receipt of a bad frame, the power control mechanism transitions from Data Start state 340 to Normal state 320. And if no data is received within a particular period of time, the power control mechanism transitions to No Data state 330.

The power control mechanism remains in Normal state 320 for the duration of the data transmission. If no data is received within a particular period of time, indicating inactivity by the remote terminal, the power control mechanism transitions to No Data state 330.

If the remote terminal loses or terminates its connection for any reason while in the Normal, No Data, or Data Start state, the power control mechanism transitions back to Inactive state 310.

As shown in FIG. 3, the transitions between the states are triggered by the occurrence of some defined events. Some of these events and their brief descriptions are provided below.

HandoffInfo (Sectors): A hand-off event occurs whenever the hand-off state of the remote terminal changes. Specifically, a hand-off event occurs if a base station is added or removed from the active set of the remote terminal. The parameter "Sectors" contains information about the sectors (i.e., the base stations) with which the remote terminal is currently in communication. If the number of sectors is zero, indicating that the remote terminal is not in communication with any base station, then the power control mechanism transitions to the Inactive state.

GoodFrame: This event indicates the receipt of a good frame on the reverse traffic channel. BadFrame: This event indicates the receipt of a bad frame on the reverse traffic channel.

For CDMA systems, such as the HDR system, cyclic redundancy check (CRC) encoding is performed at the transmitting unit (e.g., the remote terminal) for each frame and the CRC bits are appended to the frame. At the receiving unit (e.g., the base station), CRC encoding can be performed on the received frame and the generated CRC bits can be compared against the received CRC bits. Typically, the frame is declared "good" if the generated and received CRC bits match and "bad" if the CRC bits do not match.

FIG. 3 shows a specific embodiment of the invention having four states and the events that cause the transitions between these states. As noted above, greater or fewer number of states and events can be created. The states, events, and transitions can also be defined differently than that described above. For example, the power control mechanism can remain in the Data Start state until a particular number of good frames are received, at which time it can transition to the Normal state. Thus, the invention can be designed to include any number of states, any number of events, and any scheme for transitioning between the states.

In accordance with an aspect of the invention, the operation of the power control mechanism is dependent on the current state in which it resides. The general operation of the power control mechanism in each of the states for a specific embodiment of the invention can be briefly described as follows:

Inactive: In this state, the remote terminal is dormant and thus no power control is performed.

Normal: In this state, the remote terminal is sending data frequently enough such that the No Data state is not entered. The setpoint is adjusted based on the decoding status of the received frames. For each good frame received, the setpoint is lowered by a particular (small) decrement delta ($\Delta D_1$). If a bad frame is received, the setpoint is increased by a particular (larger) increment delta ($\Delta U_1$). The larger setpoint increases allow for adaptation to rapid deterioration in the air-link condition.

No Data: This state is entered when the remote terminal stops transmitting for a particular time period (e.g., 0.5 seconds). In this state, feedback is not available from the remote terminal to control its transmit power level. In an embodiment, the setpoint is slowly increased while the power control mechanism is in this state. This slow increase in the setpoint can compensate for possible degradation in the air-link during the period of no transmission. If the air-link degradation does occur, the higher setpoint would increase the likelihood of successfully decoding a received packet when the remote terminal starts transmitting.

Data Start: This state is entered when a good frame is received from the remote terminal while in the No Data state. In this state, the setpoint is lowered more than in the Normal state for each good frame received. This larger decrease in the setpoint allows the power control mechanism to offset (undo) the extra increase in the setpoint while in the No Data state.

Figure 4:
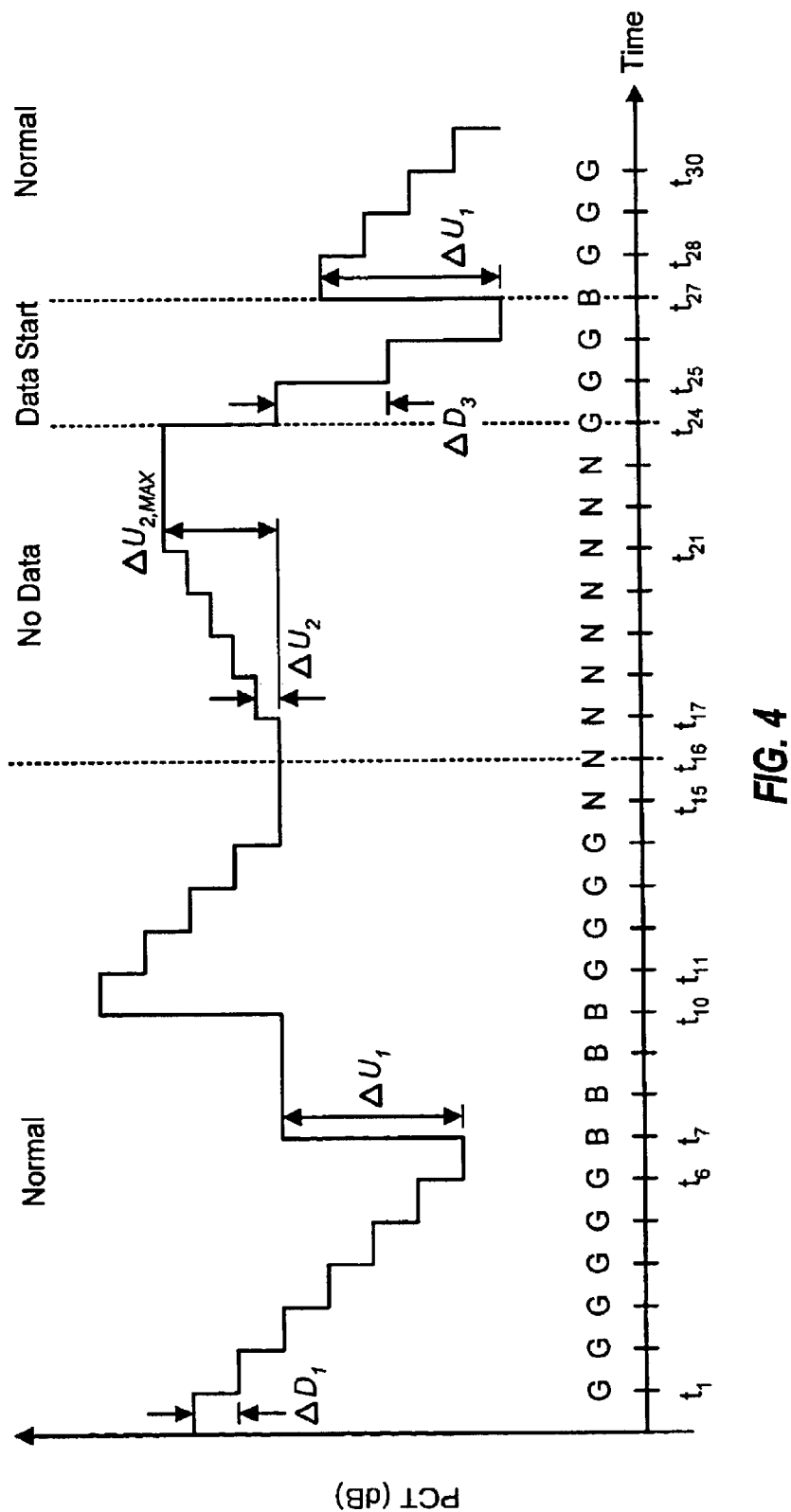
FIG. 4 is a diagram that illustrates the adjustment of the power control setpoint for a particular communication session between the remote terminal and the base station.

FIG. 4 is a diagram that illustrates the adjustment of the setpoint for a particular communication session between the remote terminal and the base station. FIG. 4 also illustrates various features of the power control mechanism of the invention, as described below. In FIG. 4, the horizontal axis represents time and is marked with time indices $t_1$, $t_2$, and so on, through $t_{30}$. The time period between successive time indices is the duration of a received frame, which is also referred to as a "frame period." The vertical axis represents the setpoint, which is provided in units of decibels (dB).

For each frame period, a frame may be received and decoded as either good (G) or bad (B), or may not be received at all (N). The status of the received frame (G, B, or N) for each frame period is provided above the horizontal axis. FIG. 4 shows a specific sequence of frame status, which is used to describe the operation of the power control mechanism of the invention.

In the example shown in FIG. 4, the power control mechanism operates in the Normal state at time indices $t_1$ through $t_{15}$, the No Data state at time indices $t_{16}$ through $t_{23}$, the Data Start state at time indices $t_{24}$ through $t_{26}$, and the Normal state from time index $t_{27}$ onward. At each of time indices $t_1$ through $t_6$, the frame received from the remote terminal is determined to be good (G), and the setpoint is decreased by a particular small amount ($\Delta D_t$). At time index $t_7$, the received frame is determined to be bad (B) and the setpoint is increased by a particular large amount ($\Delta U_1$).

In a specific implementation, in the Normal state, a particular time period needs to elapse between successive increases in the setpoint. Increasing the setpoint on every bad frame may make the power control mechanism unstable and not updating it often enough may make it sluggish. In this example, two consecutive bad frames need to be received between the frames on which the setpoint is increased. Thus, although four consecutive received frames are determined to be bad at time indices $t_7$ through $t_{10}$, the setpoint is only increased at time index $t_7$ and three time indices later at $t_{10}$, but not at time indices $t_8$ and $t_9$. At each of time indices $t_{11}$ through $t_{14}$, a good frame is received and the setpoint is again decreased accordingly.

In an embodiment, the power control mechanism transitions from the Normal state to the No Data state if no frames are received within a particular time period, which is also (coincidentally) two frame periods in this example. Thus, after the second frame period in which no data is received, at time index t16, the power control mechanism transitions to the No Data state.

In an embodiment, while in the No Data state, the setpoint is increased by a particular small amount ($\Delta U_2$) after each frame period in which no data is received, up to a particular maximum aggregate amount ($\Delta U_{2,MAX}$). Thus, at each of time indices $t_{17}$ through $t_{21}$, the setpoint is increased by the small amount ($\Delta U_2$). After the setpoint increase at time index $t_{21}$, the maximum aggregate amount ($\Delta U_{2,MAX}$) is reached and the setpoint is not increased any further at time indices $t_{22}$ through $t_{24}$ even though no data is received in this time period.

In an embodiment, the power control mechanism transitions from the No Data state to the Data Start state upon receiving a good frame from the remote terminal. Thus, upon receiving a good frame at time index $t_{24}$, the power control mechanism transitions to the Data Start state. In this state, the setpoint is decreased by a particular larger amount ($\Delta D_3$) for each received good frame. This setpoint decrease occurs at each of time indices $t_{24}$ to $t_{26}$, since the received frame is determined to be good.

In an embodiment, the power control mechanism transitions from the Data Start state to the Normal state upon receiving a bad frame from the remote terminal. Upon receiving a bad frame at time index $t_{27}$, the power control mechanism transitions to the Normal state and the setpoint is increased by the large amount ($\Delta U_1$). The power control mechanism then continues to operate in the Normal state in the manner described above.

The power control mechanism of the invention can be implemented within one or more base stations in communication with the remote terminal, the system controller (see FIG. 1), some other elements of system 100, or a combination thereof.

Figure 5:
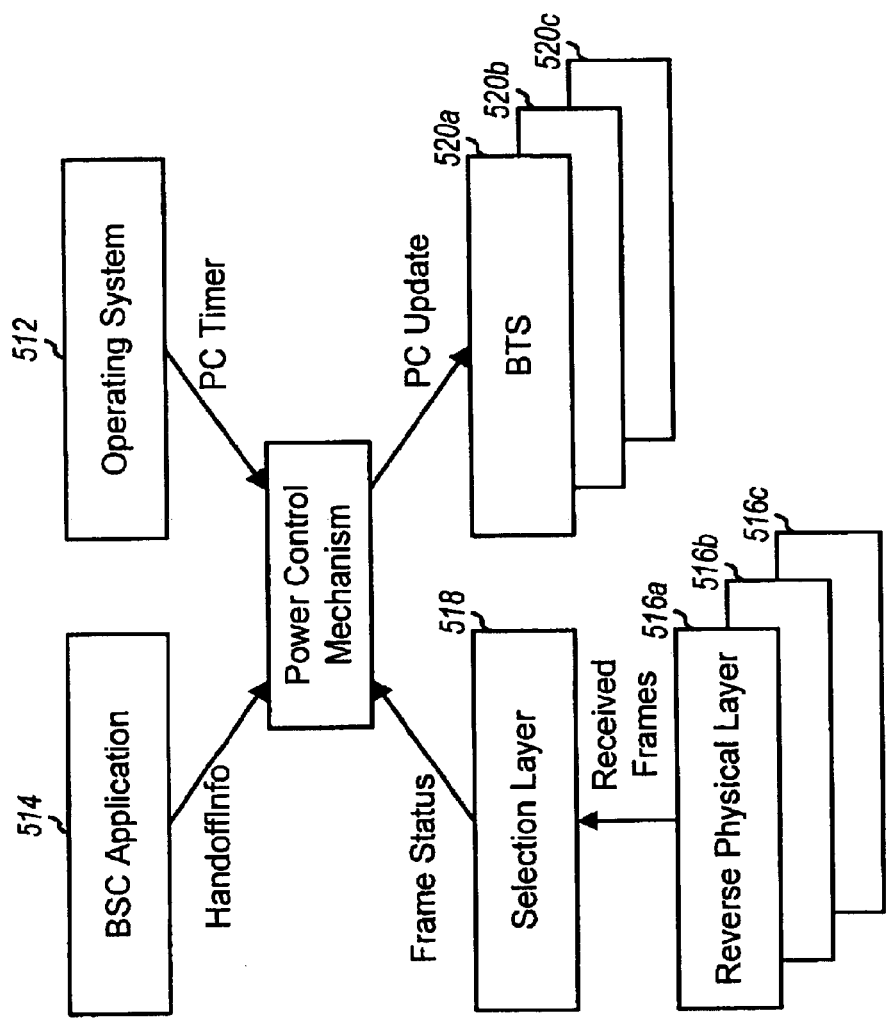
FIG. 5 is a diagram of the interaction of the power control mechanism with some of the subsystems within the base station.

FIG. 5 is a diagram of the interaction of the power control mechanism with some of the subsystems within a base station, in accordance with an embodiment of the invention. In this embodiment, the subsystems of the base station include an operating system (O/S) 512, a base station controller (BSC) application 514, one or more reverse physical layers 516, a selection layer 518, and one or more base transceiver stations (BTS) 520. The operation of the power control mechanism is dependent on the occurrence of various events, some of which are described above. Messages and/or signals notifying the occurrence of these events are typically generated by the various subsystems and forwarded to the power control mechanism.

Operating system 512 is the operating system for the base station and is used to provide timing signals for the power control mechanism. Operating system 512 can be directed to provide, for example, a periodic timer (e.g., a power control (PC) timer) that goes off every frame interval, which is used as a triggering signal by the power control mechanism to update variables and perform any required actions. Since the setpoint is typically not changed any faster than at the frame intervals, a mechanism that updates the setpoint every frame is adequate.

BSC application 514 performs the call processing for the base station and provides a message to the power control mechanism whenever the active set of the remote terminal changes. The active set includes a list of base stations in communication with the remote terminal at any particular moment. The active set changes as the remote terminal adds and removes base station (e.g., as it moves about the network).

Each active reverse physical layer 516 receives and processes frames from the remote terminal and sends them to selection layer 518. One or more reverse physical layers 516 may be assigned to receive the same frame from the remote terminal and to send them to selection layer 518. Reverse physical layers 516 belong to different base stations and are used for soft handoff.

Selection layer 518 further processes the frames received from the assigned reverse physical layers 516 and eliminates duplicate frames. Based on the outcome of the processing, selection layer 518 sends a frame status to the power control mechanism for each frame period indicating whether a good or bad frame was received, or that no frame was received for that frame period.

Base transceiver station 520 receives the reverse link transmission from the remote terminal and implements the inner loop power control. Each assigned base transceiver station 520 receives the signal for the reverse traffic channel, measures the received signal quality, and sends a sequence of power control commands to the remote terminal. Each power control command directs the remote terminal to adjust its transmit power either up or down such that the received signal quality at base transceiver station 520 is approximately equal to the setpoint. The remote terminal may be power controlled by multiple base transceiver stations 520.

In an embodiment, the power control mechanism operates based on the events that occur in various subsystems of the base station. BSC application 514 sends hand-off information for each remote terminal to the power control mechanism using the HandoffInfo (Sectors) message. This message is sent whenever BSC application 514 changes the hand-off state of the remote terminal. The parameter Sectors contains the information about the base stations in communication with the remote terminal. If the number of Sectors is zero, then the remote terminal is not communicating with any base station.

Reverse physical layers 516 receive and process frames transmitted by the remote terminal on the reverse traffic channel, and forward the processed frames to selection layer 518. Since multiple frames may be received from multiple reverse physical layers 516 for a particular transmitted frame, selection layer 518 ensures that duplicate frames are removed. For each non-duplicate frame, selection layer 518 determines whether the frame is good or bad and provides the frame status to the power control mechanism.

If the remote terminal is in hand-off with multiple (N) base transceiver stations 520, selection layer 518 can receive between 0 to N frames for each frame transmitted from the remote terminal. In some CDMA systems, such as the HDR system, the frames for a particular data transmission are identified with frame identifiers (e.g., FrameIDs). In an embodiment, selection layer 518 declares a BadFrame if the frames received from all base transceiver stations 520 with the same FrameID are bad, and a GoodFrame if at least one frame from base transceiver stations 520 is good.

If one or more base transceiver stations 520 are not able to decode a particular frame, then selection layer 518 receives less than N frames and waits for frames that may not be forthcoming. This possibly indefinite wait can be remedied if selection layer 518 only waits until a frame with a higher FrameID is received or a particular time period (e.g., one frame period) passes. Selection layer 518 can then declare a GoodFrame or BadFrame based on the received frames.

Figure 6A:
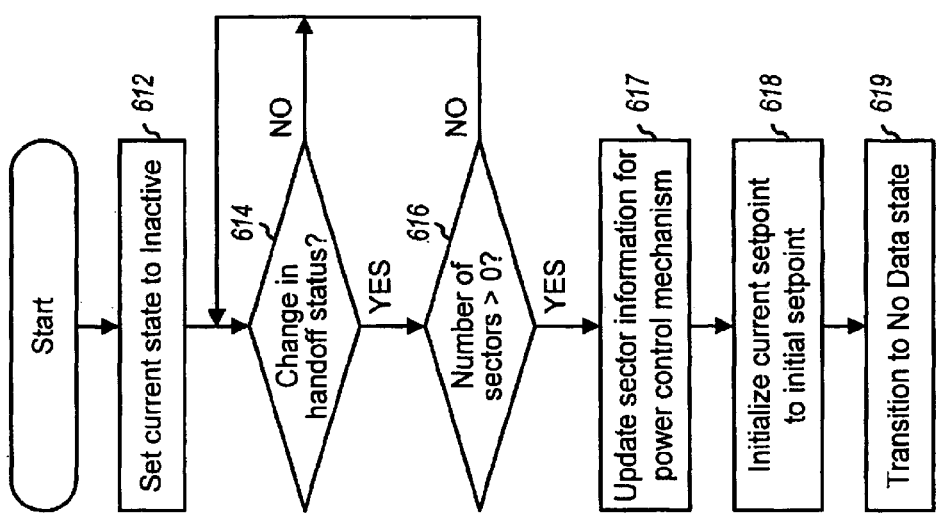
FIGS. 6A, 6B, 6C, and 6D are flow diagrams of an embodiment of the processing for the Inactive, Normal, No Data, and Data Start states, respectively.

FIG. 6A is a flow diagram of an embodiment of the processing for the Inactive state. Initially, the current state for the power control mechanism is set to the Inactive state, at step 612. A determination is then made whether a change in the handoff status of the remote terminal has occurred, at step 614. This can be achieved, for example, via receipt of the HandoffInfo (Sectors) message described above. A determination is then made if the number of sectors in the received message is greater than zero, at step 616. If the answer is no, the power control mechanism returns to step 614 and waits for a change in the handoff status of the remote terminal.

Otherwise, if the number of sectors in the received message is greater than zero, the sector information for the power control mechanism is updated, at step 617. The setpoint is then initialized to a particular initial setpoint determined to provide the desired level of performance, at step 618. The power control mechanism then transitions to the No Data state, at step 619.

Figure 6B:
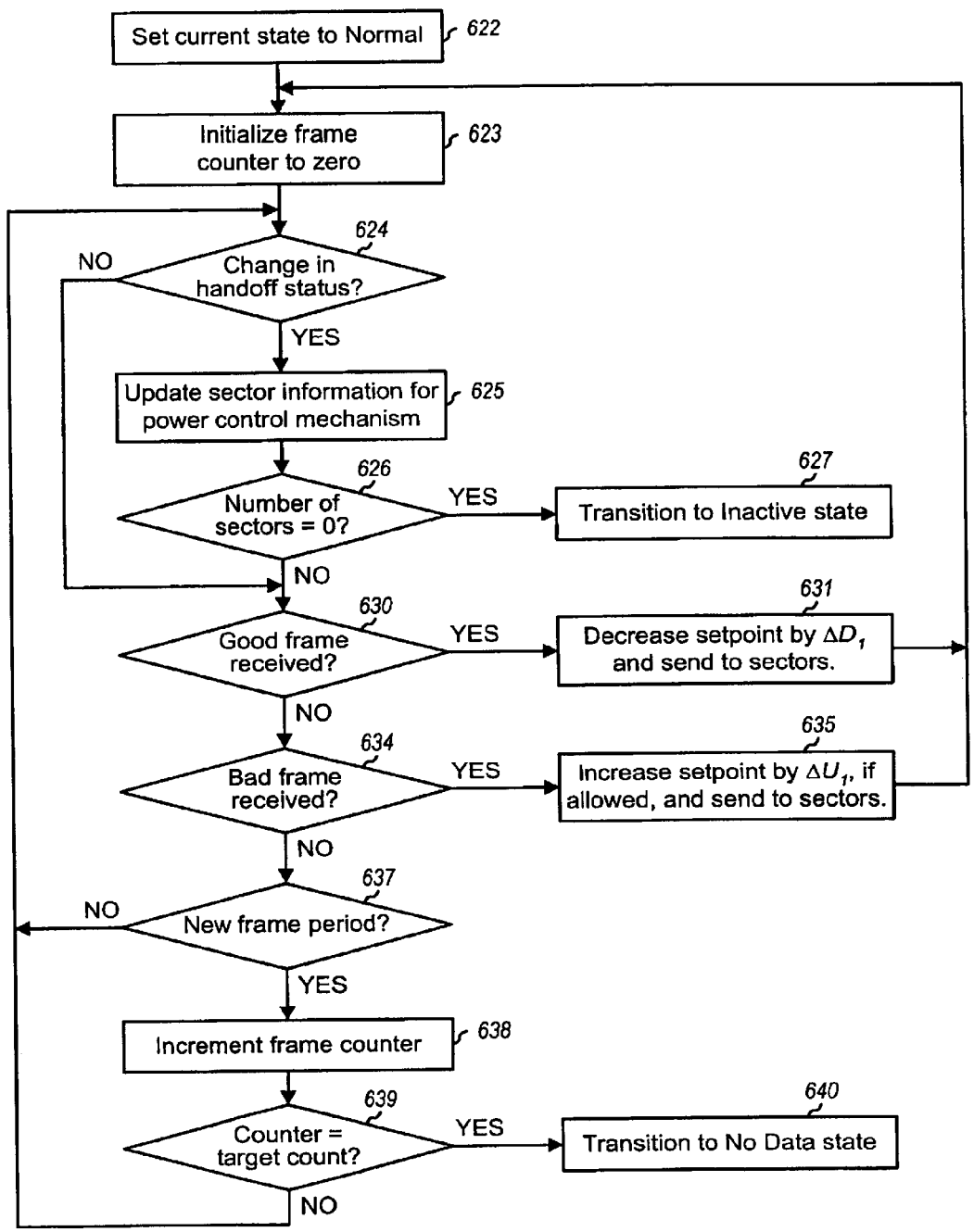

FIG. 6B is a flow diagram of an embodiment of the processing for the Normal state. Upon transitioning into the Normal state, the current state for the power control mechanism is set to the Normal state, at step 622. A frame counter used to count the number of frame periods in which no data is received is initialized to zero, at step 623.

A determination is then made whether a change in the handoff status of the remote terminal has occurred, at step 624. Again, this can be achieved via receipt of the HandoffInfo (Sectors) message described above. If the handoff status has not changed, the power control mechanism proceeds to step 630.

Otherwise, if the handoff status has changed, the sector information for the power control mechanism is updated, at step 625. A determination is then made whether the number of sectors in the received message is equal to zero, at step 626. If the answer is yes, indicating that there are no base stations in the active set of the remote terminal, the power control mechanism transitions to the Inactive state, at step 627.

Otherwise, if the number of sectors in the received message is greater than zero, a determination is made next whether a good frame was received, at step 630. If a good frame was received, the power control mechanism decreases the setpoint by $\Delta D_1$, and sends the updated setpoint to the sectors if the change is sufficiently significant, at step 631. In a specific implementation, both the BSC and BTS, which implement the outer power control loop, attempt to modify the setpoint. However, the BSC is designed with the capability to adjust the setpoint in fine increments (e.g., with a resolution of $\frac{1}{1024}$ of a dB) and the BTS is designed with the capability to adjust the setpoint in more coarse increments (e.g., with a resolution of $\frac{1}{8}$ of a dB). In this implementation, the BSC does not send the adjusted setpoint to the BTS until the accumulated changes surpass the coarse increment of the BTS. However, in other implementations, the BSC and BTS may be designed to operate with the same resolution, in which case the setpoint may be sent to the sectors regardless of the magnitude of the change. Upon completion of step 631, the power control mechanism then returns to step 623.

Otherwise, if a good frame was not received at step 630, a determination is made whether a bad frame was received, at step 634. If a bad frame was received, the power control mechanism may increase the setpoint by $\Delta U$, and send the updated setpoint to the sectors, at step 635. As noted above, the setpoint may be increased if a particular number of frame periods have elapsed since the last setpoint increase. Thus, a second frame counter can be used to keep track of the time period between setpoint increases. The second counter can be initialized to zero upon transitioning out of the Inactive state, incremented for each frame period (e.g., each time a periodic timing signal is received from the operating system), and reset to zero after each setpoint increase. After the setpoint is increased (if allowed) at step 635, the power control mechanism returns to step 623.

If a good or bad frame was not received, a determination is then made whether a new frame period has occurred, at step 637. This can be achieved via receipt of the periodic timing signal from the operating system, which goes off at every frame interval. If a new frame period has occurred, indicating that no frame was received for the previous frame period, the frame counter is incremented, at step 638. As noted above, if no frames are received for a particular number of consecutive frame periods (i.e., a target count), the remote terminal is presumed to have stopped transmitting and the power control mechanism transitions to the No Data state. Thus, the value in the frame counter is compared to the target count, at step 639. If the counter value is equal to the target count, the power control mechanism transitions to the No Data state, at step 640. Otherwise, if the counter value is less than the target count, the power control mechanism returns to step 624. As shown in FIG. 6B, the frame counter is reset to zero whenever a good or bad frame is received.

Figure 6C:
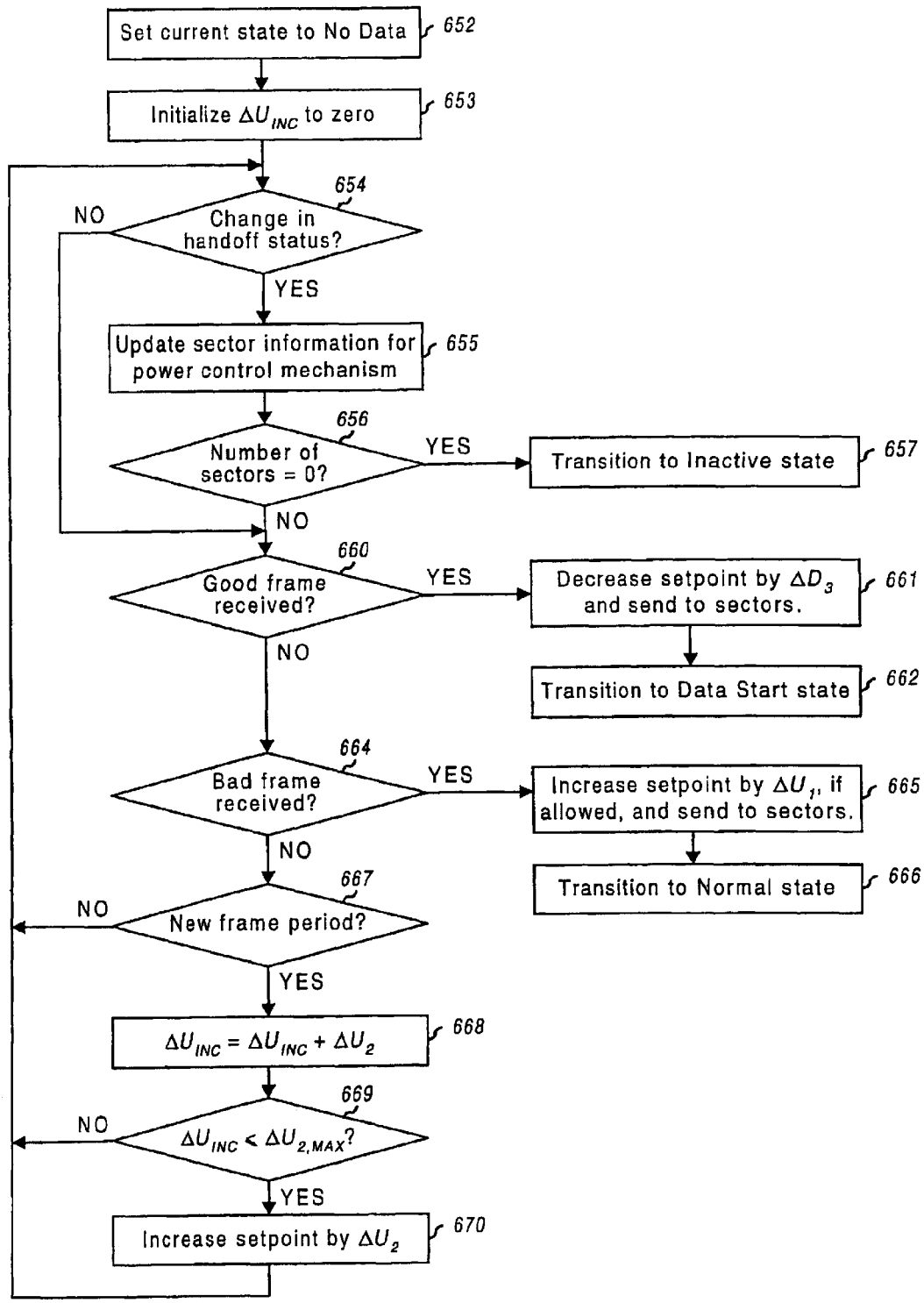

FIG. 6C is a flow diagram of an embodiment of the processing for the No Data state. Upon transitioning into the No Data state, the current state for the power control mechanism is set to the No Data state, at step 652. The amount of increase in the setpoint while in the No Data state ($\Delta U_{INC}$) is initialized to zero, at step 653.

A determination is then made whether a change in the handoff status of the remote terminal has occurred, at step 654. Again, this can be achieved via receipt of the HandoffInfo (Sectors) message. If the handoff status has not changed, the power control mechanism proceeds to step 660.

Otherwise, if the handoff status has changed, the sector information for the power control mechanism is updated, at step 655. A determination is then made whether the number of sectors in the received message is equal to zero, at step 656. If the answer is yes, indicating that there are no base stations in the active set of the remote terminal, the power control mechanism transitions to the Inactive state, at step 657.

Otherwise, if the number of sectors in the received message is greater than zero, a determination is next made whether a good frame was received, at step 660. If a good frame was received, the power control mechanism decreases the setpoint by $\Delta D_3$ and sends the updated setpoint to the sectors if the change is sufficiently significant, at step 661. The power control mechanism then transitions to the Data Start state, at step 662.

Otherwise, if a good frame was not received at step 660, a determination is made whether a bad frame was received, at step 664. If a bad frame was received, the power control mechanism increases the setpoint by $\Delta U_1$, if allowed, and sends the updated setpoint to the sectors, if the change is sufficiently significant, at step 665. The power control mechanism then transitions to the Normal state, at step 666.

If a good or bad frame was not received, a determination is then made whether a new frame period has occurred, at step 667. If a new frame period has occurred, indicating that no frame was received for the previous frame period, the setpoint is increased by $\Delta U_2$ if the total increase in the setpoint while in the No Data state is less than a specified value of $\Delta U_{2,MAX}$. This can achieved by increasing $\Delta U_{INC}$ by the increment value $\Delta U_2$, at step 668, and comparing the updated $\Delta U_{INC}$ against $\Delta U_{2,MAX}$ at step 669. If the updated $\Delta U_{INC}$ is less than or equal to $\Delta U_{2,MAX}$, the setpoint is increased by $\Delta U_2$, at step 670, and the power control mechanism returns to step 654. Otherwise, if the updated $\Delta U_{INC}$ is greater than $\Delta U_{2,MAX}$, the setpoint is not increased and the power control mechanism returns to step 654.

Figure 6D:
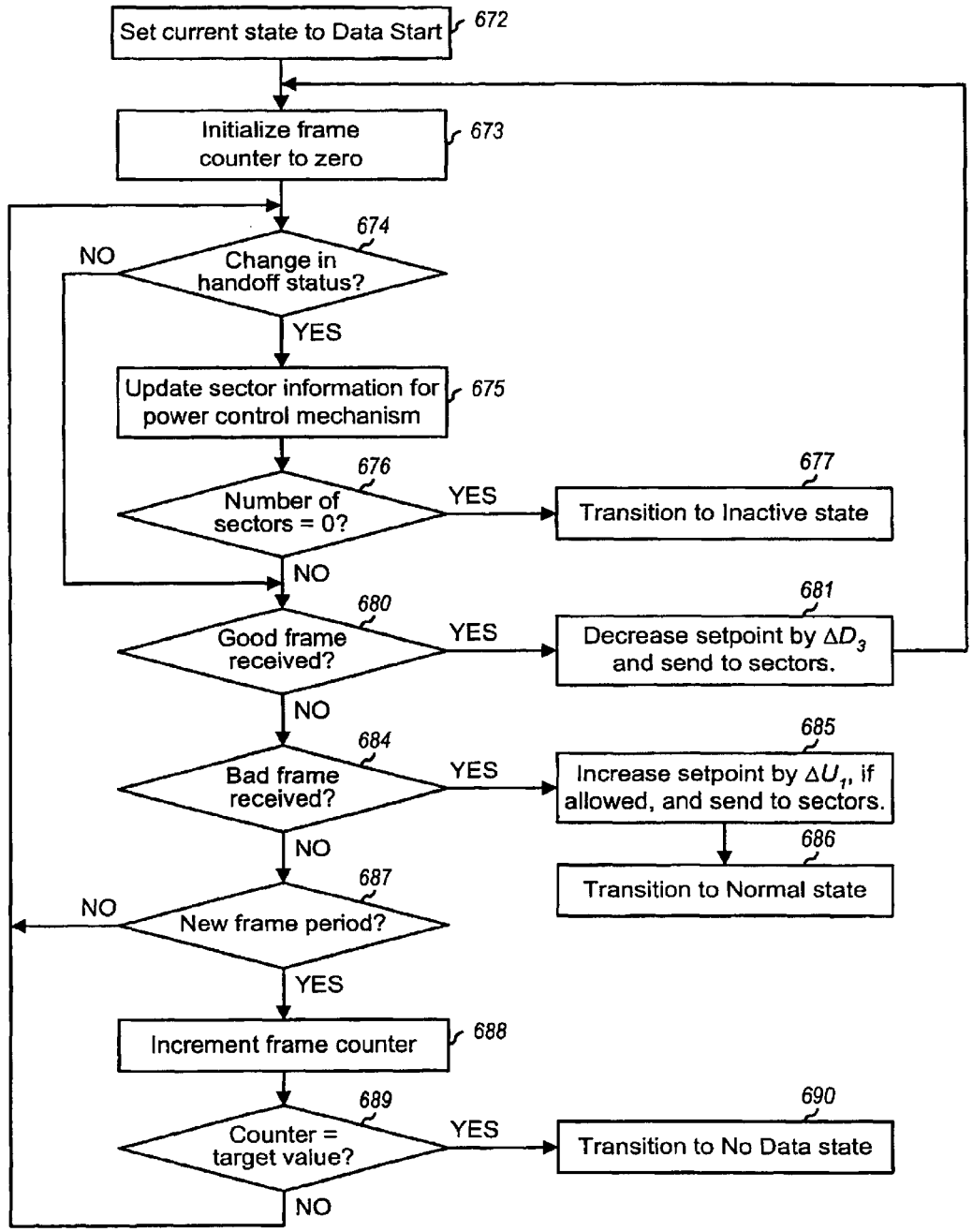

FIG. 6D is a flow diagram of an embodiment of the processing for the Data Start state. Upon transitioning into the Data Start state, the current state for the power control mechanism is set to the Data Start state, at step 672. A frame counter used to count the number of frame periods in which no data is received is initialized to zero, at step 673.

A determination is then made whether a change in the handoff status of the remote terminal has occurred, at step 674. Again, this can be achieved via receipt of the HandoffInfo (Sectors) message. If the handoff status has not changed, the power control mechanism proceeds to step 680.

Otherwise, if the handoff status has changed, the sector information for the power control mechanism is updated, at step 675. A determination is then made whether the number of sectors in the received message is equal to zero, at step 676. If the answer is yes, indicating that there are no base stations in the active set of the remote terminal, the power control mechanism transitions to the Inactive state, at step 677.

Otherwise, if the number of sectors in the received message is greater than zero, a determination is next made whether a good frame was received, at step 680. If a good frame was received, the power control mechanism decreases the setpoint by $\Delta D_3$ and sends the updated setpoint to the sectors if the change is sufficiently significant, at step 681. The power control mechanism then returns to step 673.

Otherwise, if a good frame was not received at step 680, a determination is made whether a bad frame was received, at step 684. If a bad frame was received, the power control mechanism increases the setpoint by $\Delta U_1$, if the new setpoint would be less than the maximum allowed setpoint, and sends the updated setpoint to the sectors, if the change is sufficiently significant, at step 685. The power control mechanism then transitions to the Normal state, at step 686.

If a good or bad frame was not received, a determination is then made whether a new frame period has occurred, at step 687. If a new frame period has occurred, indicating that no frame was received for the current frame period, the frame counter is incremented, at step 688. Similar to the Normal state, if no frames are received for a particular number of consecutive frame periods, the remote terminal is presumed to have stopped transmitting and the power control mechanism transitions to the No Data state. Thus, the value in the frame counter is compared to the target count, at step 689. If the counter value is equal to the target count, the power control mechanism transitions to the No Data state, at step 690. Otherwise, if a new frame period has not occurred or if the counter value is less than the target count, the power control mechanism returns to step 674. As shown in FIG. 6D, the frame counter is reset to zero whenever a good frame is received. The target count for the Data Start state may be the same as, or different from the target count for the Normal state.

The adjustment of the power control setpoint is achieved based, in part, on a set of configuration parameters. Table 2 lists some of these parameters. Different and/or additional parameters can also be defined and this is within the scope of the invention.

TABLE 2

| Parameter | Description | Unit |
|---|---|---|
| FrameLength | The duration of one frame on the reverse traffic channel (i.e., a frame period). The frame period may vary for different CDMA systems. | frames |
| MinSetPoint | The minimum allowed value for the setpoint in any state. | dB |
| MaxSetPoint | The maximum allowed value for the setpoint in any state. | dB |
| InitialSetPoint | The initial value for the setpoint. This is the starting value to be used when the power control mechanism transitions from the Inactive state. | dB |
| NormalGoodFrameDelta | The delta change to the setpoint when a good frame is received on the reverse traffic channel in the Normal state (i.e., $\Delta D_1$). This is typically a small negative value. | dB |
| NormalBadFrameDelta | The delta change to the setpoint when a bad frame is received on the reverse traffic channel in the Normal state (i.e., $\Delta U_1$). This is typically a large positive value. | dB |
| NumEmptyFramesForNoData | The number of frame periods without receiving a frame on the reverse traffic channel before transitioning from the Normal state to the No Data state. | frames |
| NoDataDelta | The delta change to the setpoint for each frame period when the power control mechanism is in the No Data state (i.e., $\Delta U_2$). | dB |
| NoDataMaxIncrease | The maximum allowed increase (total) of the setpoint in the No Data state (i.e., $\Delta U_{2,MAX}$). | dB |
| NoDataMaxSetPoint | The maximum allowed value for the setpoint in the No Data state. This value is typically lower than the MaxSetPoint value. | dB |
| DataStartGoodFrameDelta | The delta change to the setpoint when a good frame is received on the reverse traffic channel in the Data Start state (i.e., $\Delta D_3$). This value is typically larger in magnitude than that of NormalGoodFrameDelta. | dB |
| DelayBetweenIncreases | The minimum number of frame periods between successive increases in the setpoint due to a bad frame. | frames |
| MinSignificantSetPointChange | The minimum amount of change of the setpoint considered significant to be sent to the sectors. | dB |

The unit for some of the above-defined parameters is in frame periods (or simply "frames") and the unit for the remaining parameters is in data bits. The magnitude of the setpoint deltas, and the initial, minimum, and maximum setpoints can be selected to provide the desired level of performance (e.g., 1% FER) and may be provided, for example, in fractions of dB (e.g., $1/1024^{th}$ of a dB). For example, the minimum setpoint (MinSetPoint) and maximum setpoint (MaxSetPoint) can be selected based on simulation, empirical measurements (i.e., lab results), or a combination thereof. The parameters and some of their effects are described below.

Increasing the NormalBadFrameDelta parameter allows the power control mechanism to be more responsive to degradations in the air-link conditions. However, this also results in the setpoint being adjusted higher and can thus reduce system capacity.

Increasing the NoDataDelta or NoDataMaxIncrease parameter reduces the likelihood of receiving a frame in error when the remote terminal starts transmitting again after a period of inactivity. This may result in a reduction in system capacity.

Increasing the DataStartGoodFrameDelta parameter causes the power control mechanism to lower the setpoint faster when the remote terminal starts transmitting after a period of inactivity.

The DelayBetweenIncreases parameter is typically set based, in part, on the delay between the base station and the BSC. Also, increases in the setpoint are not performed close in time (e.g., on consecutive frames) since frame errors tend to occur in bursts and a large change in setpoint due to a burst of errors may result in the remote terminal transmitting more power than needed. If the delay between the base station and the BSC can be reduced, the DelayBetweenIncreases value may be decreased, which can improve the responsiveness of the power control mechanism.

The NumEmptyFramesForNoData parameter can be decreased to force the power control mechanism to transition to the No Data state earlier. This parameter is typically not shorter than the TCP acknowledgement time, which is typically 200 msec.

Generally, the target FER is defined as the ratio of the delta decrease in the setpoint to the delta increase in the setpoint (e.g., $\Delta D_1/(\Delta D_1+\Delta U_1)$). Thus, by adjusting the delta increase, the delta decrease, or both, the target FER can be adjusted.

Various modifications can be made to the power control mechanism to further improve performance. Some of the modifications can be dependent on the particular CDMA system being implemented.

In the HDR system, DRC (data rate control) information is transmitted from a remote terminal to a base station at a particular rate (e.g., 600 times a second). The DRC indicates which sector is best received by the remote terminal, and thus should be used to send forward link data to the remote terminal. The DRC also indicates the rate at which the sector should be sending the data on the forward link. Unlike data packets, which may be received by any sector in the active set of the remote terminal, the DRC needs to be received by the sector serving the forward link.

The transmitted DRC information may be erased (i.e., impossible to decode correctly) due to degraded link conditions. Under normal operation, the DRC and reverse link data are both transmitted from the remote terminal to the sector determined able to best serve the remote terminal. In this case, controlling the transmit power on the data channel also provides an acceptable DRC erasure rate. However, for an unbalanced situation, the best forward link is achieved via one sector but the best reverse link is achieved via another sector. In this case, performing power control on just the data channel sent to one sector may not be sufficient to ensure that the DRC channel sent to the other sector can be properly decoded. Modification can be made to the power control mechanism to prevent excessive degradation of the DRC channel as received by the sector designated to serve the forward link.

For the HDR system, DRC information can be received every 1.66 msec from the remote terminal. In typical implementations, it is impractical to send information at this rate to the BSC for power control. Various schemes can be used to provide and apply the DRC information to modify the power control mechanism, two of which are described below. The first scheme can be used for systems having a limited backhaul capacity and the second scheme can be used for systems having less restricted backhaul capacity. In both of these schemes, the target FER (which is typically set at approximately 1%) can be adjusted to achieve the desired DRC erasure rate.

In the first scheme, which is suitable for use in systems having limited backhaul capacity, a message can be sent from the base station to the BSC when the DRC erasure rate is too high for proper operation of the system. This scheme does not generate high message traffic between the base station and the BSC, which is desirable for systems with limited backhaul capacity.

The DRC erasure rate can be used to implement an "outer" outer power control loop (i.e., a third loop) that continuously adjusts the target FER that the outer power control loop attempts to achieve. If the DRC erasure rate is determined to be too high, the target FER can be decreased by a (relatively) large amount, which then causes the setpoint to increase. This in turn causes the transmit power level to increase, which then causes the DRC erasure rate to decrease. The target FER can then be increased by a small amount for each frame period.

As noted above, the target FER can be adjusted by changing the magnitude of the delta increase in the setpoint, the delta decrease, or both. In an embodiment, the power control mechanism is implemented to use an EffectiveBadFrameDelta, instead of the NormalBadFrameDelta, to adjust the setpoint when a bad frame is received. The EffectiveBadFrameDelta parameter can be adjusted based on the NormalBadFrameDelta parameter and the target FER, which is adjusted from the original FER based on the DRC erasure rate. The EffectiveBadFrameDelta can also be used in all states defined above including the Normal, the No Data, and the Data Start states.

If the DRC erasure rate is too high, indicating that the remote terminal is not transmitting at sufficient power level, the target FER can be adjusted lower. The lower target FER can be achieved by increasing the magnitude of the delta increase in the setpoint (i.e., increasing $\Delta U_{EFF}$), thereby increasing the setpoint. The inner power control loop then causes the transmit power level of the remote terminal to increase to match the increased setpoint.

Figure 7A:
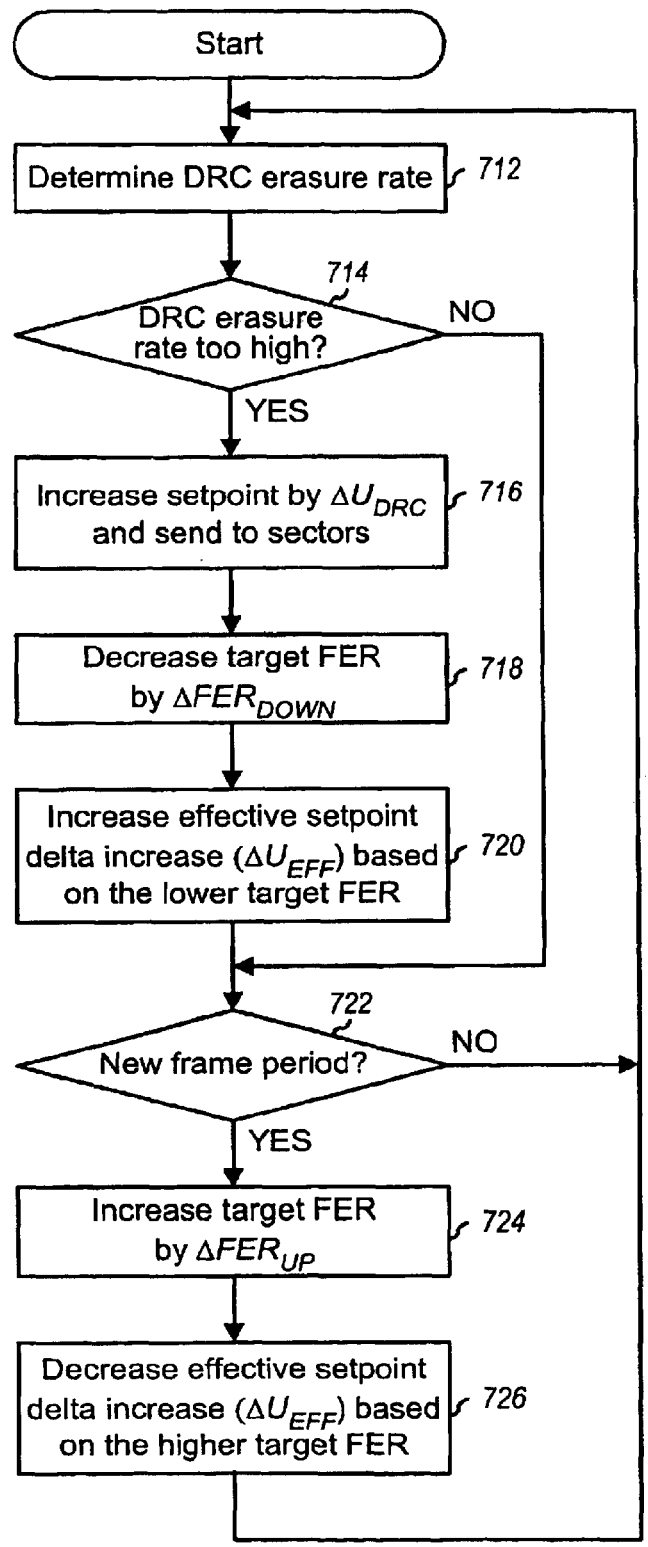
FIGS. 7A and 7B are flow diagrams of an embodiment of two different schemes for adjusting the power control mechanism to account for DRC (data rate control) erasures.

FIG. 7A is a flow diagram of an embodiment of a scheme for adjusting the power control mechanism to account for DRC erasures. Initially, the DRC erasure rate is determined, at step 712. Typically, the DRC erasure rate is updated every particular number of frame periods. If the DRC erasure rate is determined to be acceptable, at step 714, the process proceeds to step 722. Otherwise, if the DRC erasure rate is determined to be too high (e.g., as indicated by receipt of a DRCErasureTooHigh message), the setpoint is increased by a particular amount ($\Delta U_{DRC}$) and sent to the sectors, at step 716. The target FER is then decreased by a particular amount ($\Delta FER_{DOWN}$), at step 718, and the effective setpoint delta increase ($\Delta U_{EFF}$) is increased based on the lower target FER. The higher setpoint delta increase ($\Delta U_{EFF}$) results in a higher setpoint, which then causes the transmit power level to increase and the DRC erasure rate to decrease.

At step 722, a determination is then made whether a new frame period has occurred. If a new frame period has not occurred, the process returns to step 712. Otherwise, the target FER is increased by a particular amount ($\Delta FER_{UP}$), at step 724, and the effective setpoint delta increase ($\Delta U_{EFF}$) is decreased based on the higher target FER. The process then returns to step 712.

In the second scheme, which is suitable for use in systems having higher backhaul capacity, the target FER can be continually adjusted to achieve the desired DRC erasure rate. This scheme uses the regular feedback sent from the base station to the BSC indicating the status of the DRC erasure information. The scheme determines the DRC erasure rate and adjusts the effective delta setpoint increase ($\Delta U_{EFF}$) based on the determined DRC erasure rate.

Figure 7B:
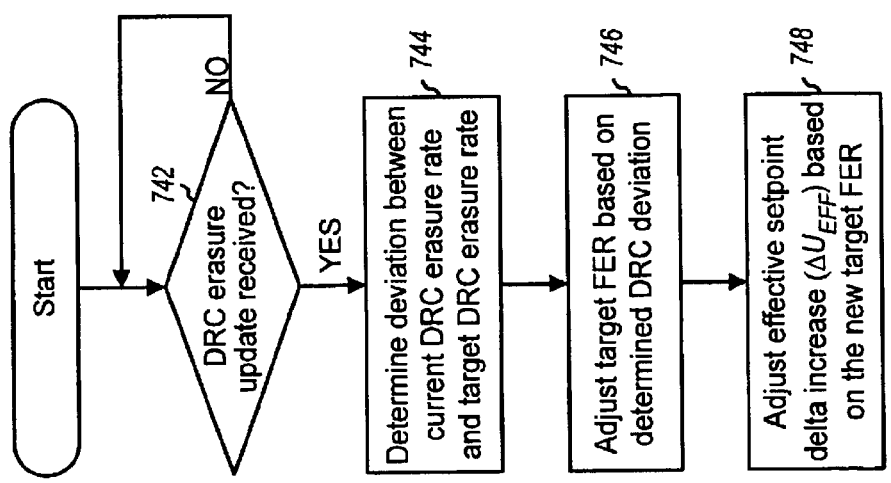

FIG. 7B is a flow diagram of an embodiment of a second scheme for adjusting the power control mechanism to account for DRC erasures. Initially, a determination is made whether a DRC erasure update is received, at step 742. If no DRC update was received, the process returns to step 742. Otherwise, if a DRC update was received, the deviation between the current DRC erasure rate and a target DRC erasure rate is determined, at step 744. The target FER is then adjusted based on the determined DRC deviation, at step 746, and the effective setpoint delta increase ($\Delta U_{EFF}$) is adjusted based on the new target FER, at step 748. As shown in FIG. 7B, the target DRC erasure rate can be achieved by continual adjustment of the target FER.

Other schemes to adjust the transmit power level of the remote terminal to achieved the desired DRC erasure rate can also be implemented and are within the scope of the invention. For example, the DRC erasure rate can be used to adjust an effective setpoint delta decrease ($\Delta D_{EFF}$) instead of, or in combination with, the effective setpoint delta increase ($\Delta U_{EFF}$). Also, the DRC erasure rate can be used to directly adjust the setpoint.

As noted above, the power control mechanism can be modified to achieve the desired DRC erasure rate based on a set of events. Some of these events and their brief descriptions are provided below.

DRCErasureTooHigh: This event occurs when the DRC erasure is unacceptable and the sector is unable to send data to the remote terminal. The sector serving the forward link sends a message indicative of the occurrence of this event to the power control mechanism.

DRCErasureUpdate: This event occurs every period in which the DRC erasure is updated. The sector serving the forward link sends a message indicative of the occurrence of this event to the power control mechanism. A parameter in the message specifies the current DRC erasure rate.

The adjustment of the effective setpoint can be achieved based, in part, on a set of DRC configuration parameters. Table 3 lists some of these parameters. Different and/or additional parameters can also be defined and these are within the scope of the invention.

TABLE 3

| Parameter | Description | Unit |
|---|---|---|
| DRCErasure MaxFERChange | The maximum allowed change in the target FER due to DRC erasures. If a value of −40 is specified, the original target FER can be reduced by up to 40%. | % |
| DRCErasure FERDelta | The amount to modify the target FFR when a DRCErasureTooHigh event occurs. This is a (relatively) large negative value. | % |
| DRCNormal FERDelta | The amount to modify the target FER when the DRC is received as expected. This is a small positive value. | % |
| DRCErasure SetPointDelta | The delta change for the setpoint when a DRCErasureTooHigh message is received. This change in setpoint is used to provide a quick recovery for an unbalanced situation. | dB |
| DRCErasureRate FERRatio | The percent of change in the target FER for each percent of deviation of the DRC erasure rate from its target value. | |
| DRCTarget ErasureRate | The acceptable target erasure rate for the DRC. | % |
| DRCErasure UpdatePeriod | The period between successive DRC erasure update events. | frames |

As described above, decreasing the target FER causes the setpoint to be adjusted higher to achieve the lower target FER, and increasing the target FER causes the setpoint to be adjusted lower.

Figure 8:
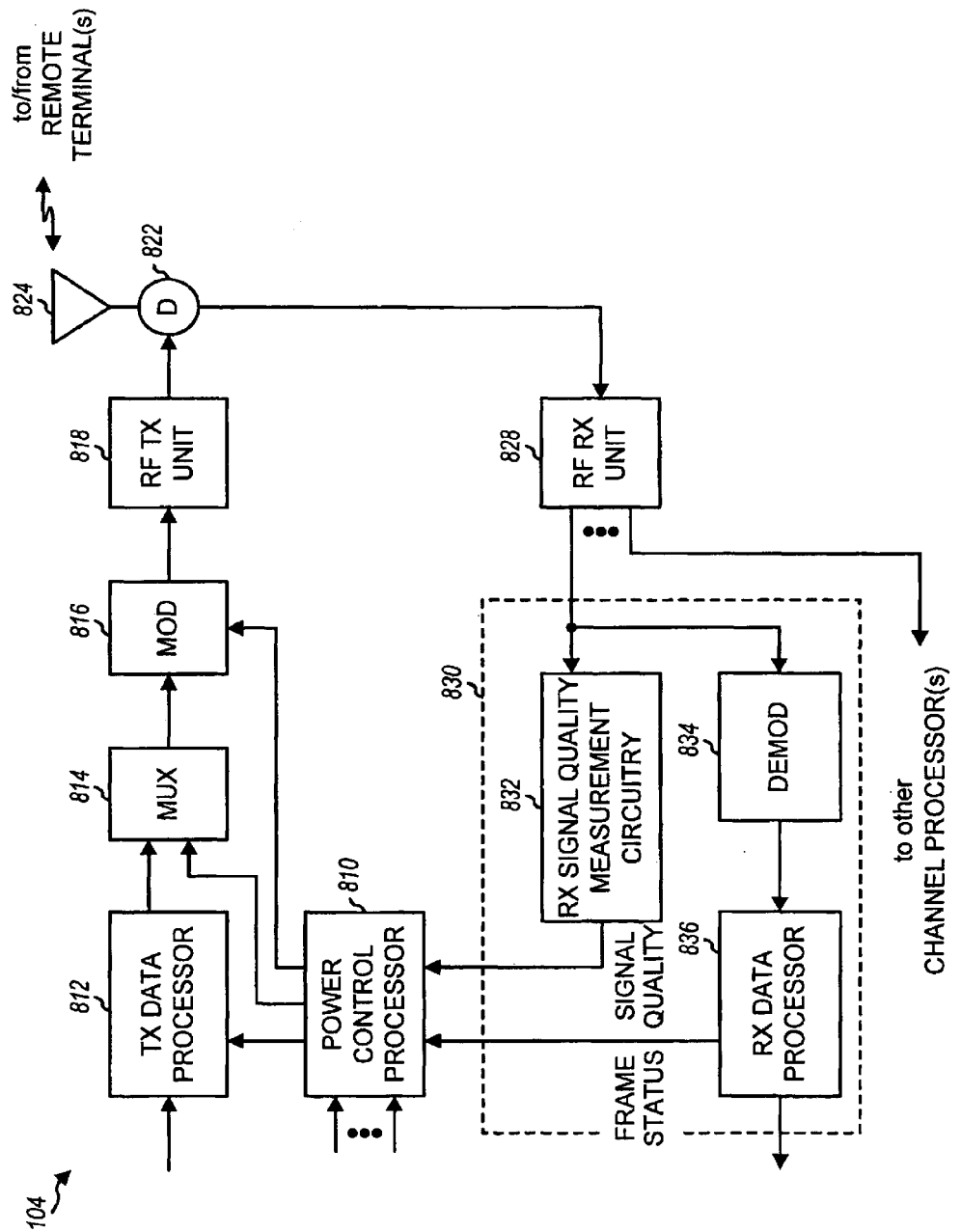
FIG. 8 is a block diagram of an embodiment of the base station.

FIG. 8 is a block diagram of an embodiment of base station 104, which is capable of implementing some embodiments of the invention. On the forward link, data is received by a transmit (TX) data processor 812 and processed (i.e., formatted, encoded, and so on). The processed data and power control information (e.g., power control commands) are provided to a multiplexer (MUX) 814 that multiplexes the power control information with the processed data. The multiplexed output is then provided to a modulator (MOD) 816 and further processed (e.g., covered with a cover code, spread with short PN sequences, scrambled with a long PN sequence assigned to the recipient remote terminal, and so on). The modulated data is then provided to an RF TX unit 818 and conditioned (e.g., converted to one or more analog signals, amplified, filtered, quadrature modulated, and so on) to generate a forward link signal. The forward link signal is routed through a duplexer 822 and transmitted via an antenna 824 to the remote terminal(s).

Figure 9:
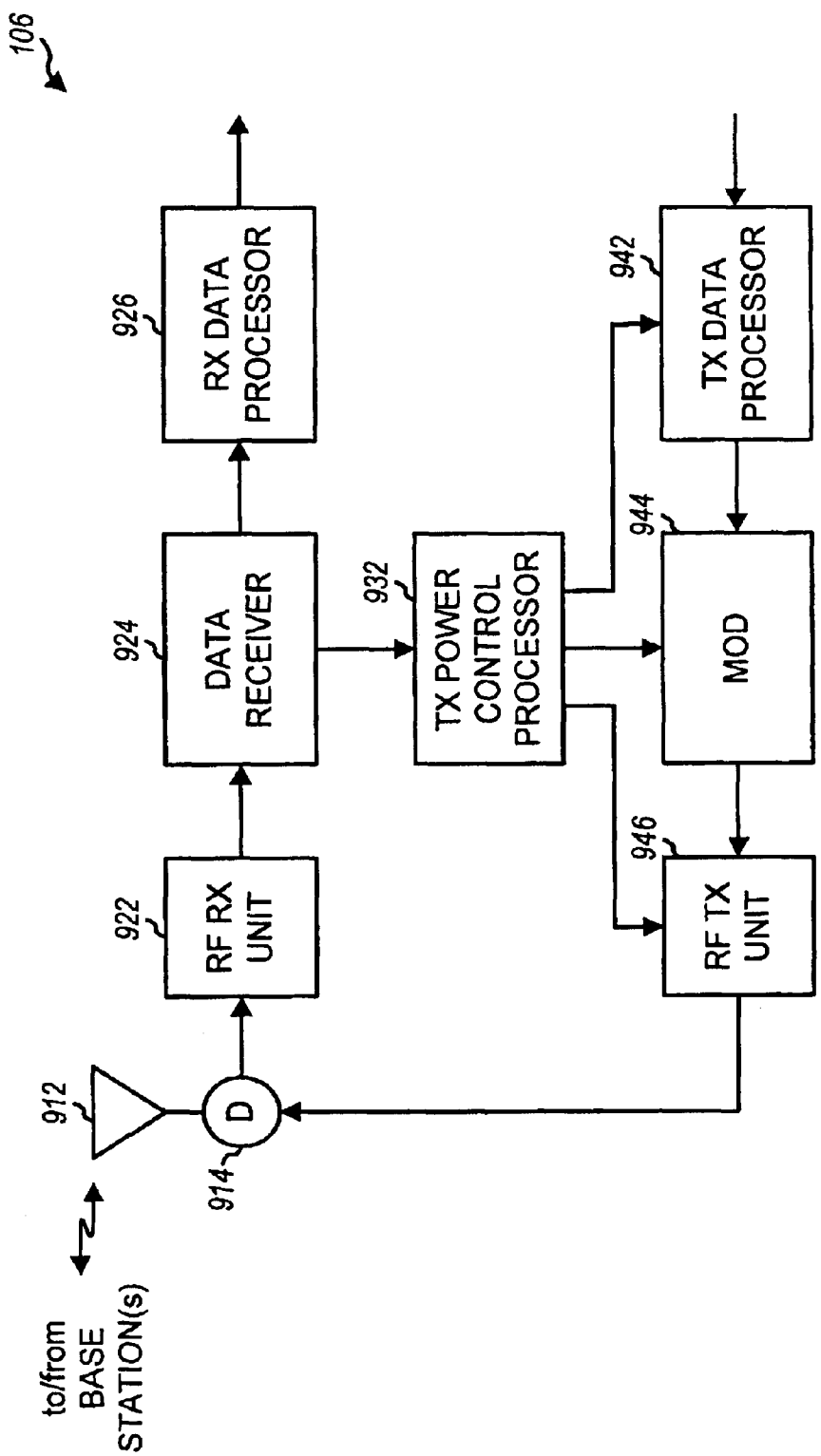
FIG. 9 is a block diagram of an embodiment of the remote terminal.

FIG. 9 is a block diagram of an embodiment of remote terminal 106. On the forward link, the forward link signal is received by an antenna 912, routed through a duplexer 914, and provided to an RF receiver unit 922. RF receiver unit 922 conditions (i.e., filters, amplifies, downconverts, and digitizes) the received signal and provides samples. A data receiver 924 receives and processes (e.g., despreads, decovers, and pilot demodulates) the samples to provide recovered symbols. Data receiver 924 may implement a rake receiver that processes multiple instances of the received signal and generates combined recovered symbols. A receive data processor 926 then decodes the recovered symbols, checks the received frames, and provides the output data.

On the reverse link, data is received by a transmit (TX) data processor 942 and processed (i.e., formatted, encoded, and so on). The processed data is provided to a modulator (MOD) 944 and further processed (e.g., covered, spread, possibly scaled to adjust the transmit signal level, and so on). The modulated data is then provided to an RF TX unit 946 and conditioned (e.g., converted to analog signals, amplified, filtered, quadrature modulated, and so on) to generate a reverse link signal. The reverse link signal is routed through duplexer 914 and transmitted via antenna 912 to one or more base stations 104.

Referring back to FIG. 8, on the reverse link, the reverse link signal is received by antenna 824, routed through duplexer 822, and provided to an RF receiver unit 828. RF receiver unit 828 conditions (i.e., downconverts, filters, and amplifies) the received signal and provides a conditioned reverse link signal for each remote terminal being received. A channel processor 830 receives and processes the conditioned signal for one remote terminal to recover the transmitted data and to generate signals that can be used to control the operation of the power control mechanism.

Within channel processor 830, the conditioned signal is measured by RX signal quality measurement circuitry 832 to determine the received signal quality for the remote terminal. The signal quality measurement can be achieved using various techniques, including those described in the aforementioned U.S. Pat. Nos. 5,056,109 and 5,265,119. The measured signal quality is provided to a power control processor 810, which compares the measured signal quality to the setpoint and sends a proper responsive power control command to the remote terminal.

A demodulator (DEMOD) 834 also receives and processes (e.g., despreads and decovers) the conditioned signal to provide recovered symbols. Demodulator 834 may also implement a rake receiver that processes multiple instances of the received signal and generates combined recovered symbols. A receive data processor 836 then decodes the recovered symbols, checks the received frames, and provides the output data. For each frame period, receive data processor 836 also provides to power control processor 810 an indication whether the received frame is good or bad, or that no frame was received.

Power control processor 810 implements the inner and outer loops described above. For the inner loop, power control processor 810 receives the measured signal quality and sends a sequence of power control commands, which can be sent on the forward link transmission, for example, by inserting it via multiplexer 814. For the outer loop, power control processor 810 receives the indication of good, bad, or no frame from data processor 836 and adjusts the setpoint for the remote terminal accordingly in the manner described above.

The power control mechanism of the invention can be implemented by various means. For example, power control mechanism can be implemented with hardware, software, or a combination thereof. For a hardware implementation, the elements in the power control mechanism can be implemented within one or more application specific integrated circuits (ASICs), digital signal processors (DSPs), programmable logic devices (PLDs), controllers, micro- controllers, microprocessors, other electronic units designed to perform the functions described herein, or a combination thereof.

For a software implementation, the elements in the power control mechanism can be implemented with modules (e.g., procedures, functions, and so on) that perform the functions described herein. The software code can be stored in a memory unit and executed by a processor (e.g., transmit power control processor 932 in FIG. 9).

Although various aspects and features of the power control mechanism of the invention have been described for the reverse link, some of these aspects and features can be advantageously applied for the forward link power control. For example, the power control mechanism for the forward link can be designed to operate based on a set of states, with the operation of the power control being dependent on the state in which it is operating. The power control on the forward link can also be adjusted in varied steps.

The foregoing description of the preferred embodiments is provided to enable any person skilled in the art to make or use the present invention. Various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. A power control unit for use in a wireless communication system, comprising:

a data processor operative to receive and process an input signal to provide status of frames of data received from the input signal for a particular data transmission;

a state machine operative to receive the frame status and provide a current state for the power control unit, wherein the current state is indicative of a status of a particular communication session comprising the data transmission, and wherein the current state is one of a plurality of possible states for the power control unit;

a threshold adjustment element operative to receive the frame status and the current state and to adjust a power control setpoint in response thereto for each frame period, and wherein the setpoint is adjusted in accordance with a particular adjustment scheme selected from a plurality of possible adjustment schemes, and wherein each of the possible adjustment schemes corresponds to a respective one of the possible states and defines a particular set of rules for adjusting the setpoint.

2. The power control unit of claim 1, wherein the communication session is characterized by non-continuous data transmission comprising bursts of data transmission separated by periods of no transmission.

3. The power control unit of claim 1, wherein the current state is defined based, in part, on the frame status and a prior state.

4. The power control unit of claim 1, wherein each frame status indicates receipt of a good frame, a bad frame, or no received frame for a corresponding frame period.

5. The power control unit of claim 1, wherein the possible states includes an inactive state, a no data state, and a normal state.

6. The power control unit of claim 5, wherein the power control unit transitions from the inactive state to the no data state upon receipt of an indication of a change in a set of base stations involved in the communication session.

7. The power control unit of claim 5, wherein the power control unit transitions from the normal state to the no data state if no data frames are received for a particular time period.

8. The power control unit of claim 5, wherein the power control unit transitions from the no data state to the normal state upon receipt of a bad frame.

9. The power control unit of claim 5, wherein the power control unit transitions from the inactive state or the no data state to the inactive state upon receipt of an indication that no base stations are currently active in the communication session.

10. The power control unit of claim 5, wherein the setpoint is adjusted in a first direction by a first delta value ($\Delta D_1$) upon receipt of a frame status indicating a good frame, if the current state is the normal state.

11. The power control unit of claim 10, wherein the setpoint is adjusted in a second direction by a second delta value ($\Delta U_1$) upon receipt of a frame status indicating a bad frame, if the current state is the normal state, and wherein the second delta value ($\Delta U_1$) is greater in magnitude than the first delta value ($\Delta D_1$).

12. The power control unit of claim 11, wherein successive adjustments in the setpoint in the second direction is not performed while in the normal state unless a particular time period has elapsed.

13. The power control unit of claim 5, wherein the setpoint is adjusted in a second direction by a third delta value ($\Delta U_2$) upon receipt of a frame status indicating no received frame, if the current state is the no data state.

14. The power control unit of claim 13, wherein the adjustment in the setpoint in the second direction is limited to a particular maximum delta value ($\Delta U_{MAX}$) while the current state is the no data state.

15. The power control unit of claim 10, wherein the possible states further include a data start state.

16. The power control unit of claim 15, wherein the power control unit transitions from the no data state to the data start state upon receipt of a good frame.

17. The power control unit of claim 15, wherein the power control unit transitions from the data start state to the normal state upon receipt of a bad frame.

18. The power control unit of claim 15, wherein the setpoint is adjusted in the first direction by a fourth delta value ($\Delta D_3$) upon receipt of a frame status indicating a good frame, if the current state is the data start state, and wherein the fourth delta value ($\Delta D_3$) is greater in magnitude than the first delta value ($\Delta D_1$).

19. The power control unit of claim 1, further comprising a comparator configured to provide a power control command to adjust a transmit power level of a reverse link transmission from a remote terminal.

20. The power control unit of claim 1, wherein one or more frames are received for a particular transmitted data frame, and wherein the frame status corresponding to the transmitted frame is declared to be a good frame if at least one of the one or more received frames is determined to be a good frame.

21. The power control unit of claim 1, wherein one or more frames are received for a particular transmitted data frame, and wherein the frame status corresponding to the transmitted frame is declared to be a bad frame if all of the one or more received frames are determined to be bad frames.

22. The power control unit of claim 1, wherein the power control setpoint is further adjusted based on a particular target frame error rate (FER) for the received frames.

23. The power control unit of claim 1, wherein the power control setpoint is further adjusted based on a particular target erasure rate of packets transmitted along with the frames of data.

24. The power control unit of claim 23, wherein the setpoint is adjusted in a second direction by an effective delta value ($\Delta U_{EFF}$) upon receipt of a frame status indicating a bad frame, and wherein the effective delta value is adjusted based on an actual erasure rate of the packets.

25. The power control unit of claim 24, wherein effective delta value ($\Delta U_{EFF}$) is increased if the actual erasure rate of the packets is above a target value and decreased if the actual erasure rate is below the target value.

26. The power control unit of claim 1, wherein the data transmission comprises a reverse link data transmission in a CDMA communication system.

27. A method for providing power control of a transmitted signal in a wireless communication system, the method comprising:

receiving and processing the transmitted signal to provide status of frames of data received from the received and processed signal for a particular data transmission;

providing a current state for a power control mechanism, wherein the current state is indicative of a status of a particular communication session comprising the data transmission, and wherein the current state is one of a plurality of possible states for the power control mechanism;

adjusting a power control setpoint for each frame period in response to the frame status and the current state, wherein the setpoint is adjusted in accordance with a particular adjustment scheme selected from a plurality of possible adjustment schemes, and wherein each of the possible adjustment schemes corresponds to a respective one of the possible states and defines a particular set of rules for adjusting the setpoint.

28. The method of claim 27, wherein each frame status indicates receipt of a good frame, a bad frame, or no received frame for a corresponding frame period.

29. A base station in a wireless communication system, comprising:

an RF receiver unit operative to receive and modulated signal over a wireless communication link and to condition the received signal to generate a conditioned signal;

a channel processor operative to receive and process the conditioned signal to provide status of frames of data received from the modulated signal for a particular data transmission; and a power control processor operative to receive the frame status and provide a power control setpoint in response thereto, wherein the power control processor includes:

a state machine operative to receive the frame status and provide a current state for the power control processor, wherein the current state is indicative of a status of a particular communication session comprising the data transmission, and wherein the current state is one of a plurality of possible states for the power control unit;

a threshold adjustment element operative to receive the frame status and the current state and to adjust the power control setpoint in response thereto for each frame period, wherein the setpoint is adjusted in accordance with a particular adjustment scheme selected from a plurality of possible adjustment schemes, and wherein each of the possible adjustment schemes corresponds to a respective one of the possible states and defines a particular set of rules for adjusting the setpoint.

30. The base station of claim 29, wherein the channel processor includes signal quality measurement circuit operative to receive the conditioned signal and provide an indication of a signal quality of the conditioned signal, and a data processor operative to receive, demodulate, and decode the conditioned signal to provide the frame status.

* * * * *